Nov. 17, 1931.  C. BROADWICK  1,832,180

PARACHUTE

Filed Nov. 5, 1928

INVENTOR.
CHARLES BROADWICK
BY
ATTORNEY

Patented Nov. 17, 1931                                                    1,832,180

UNITED STATES PATENT OFFICE

CHARLES BROADWICK, OF SAN FRANCISCO, CALIFORNIA

PARACHUTE

Application filed November 5, 1928. Serial No. 317,144.

This invention relates particularly to parachutes for transporting humans, airplanes, and other objects through the air at a slow rate of speed, to the ground.

An object of the invention is to provide a parachute which may or may not be provided with a vent in the head thereof, which is adapted to open and contract in accordance with the varying air pressures below the parachute, and which also is provided with a skirt around the outside of the edge of the parachute, and which also may or may not be provided with vents therein adapted to open and contract in accordance with the varying air pressures below the parachute, whereby the vents in both the parachute and skirt will open when encountering a sudden impact or pressure of air below the parachute, to resiliently absorb the same and after the pressure has been relieved, the vents will contract, thereby avoiding tearing of the material out of which the parachute and skirt are formed.

A further object of the invention is to provide a parachute with a skirt around the circumference of the outside thereof capable of assisting in the support of any load carried by the parachute, whereby a parachute of a relatively small size provided with a skirt thereon, will safely carry to the ground, at a slower speed and without swinging or oscillating movement, a greater load than that which might be carried by a parachute of the same size not equipped with a skirt.

Other objects of the invention are to provide a load carrying parachute that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Figure 1:
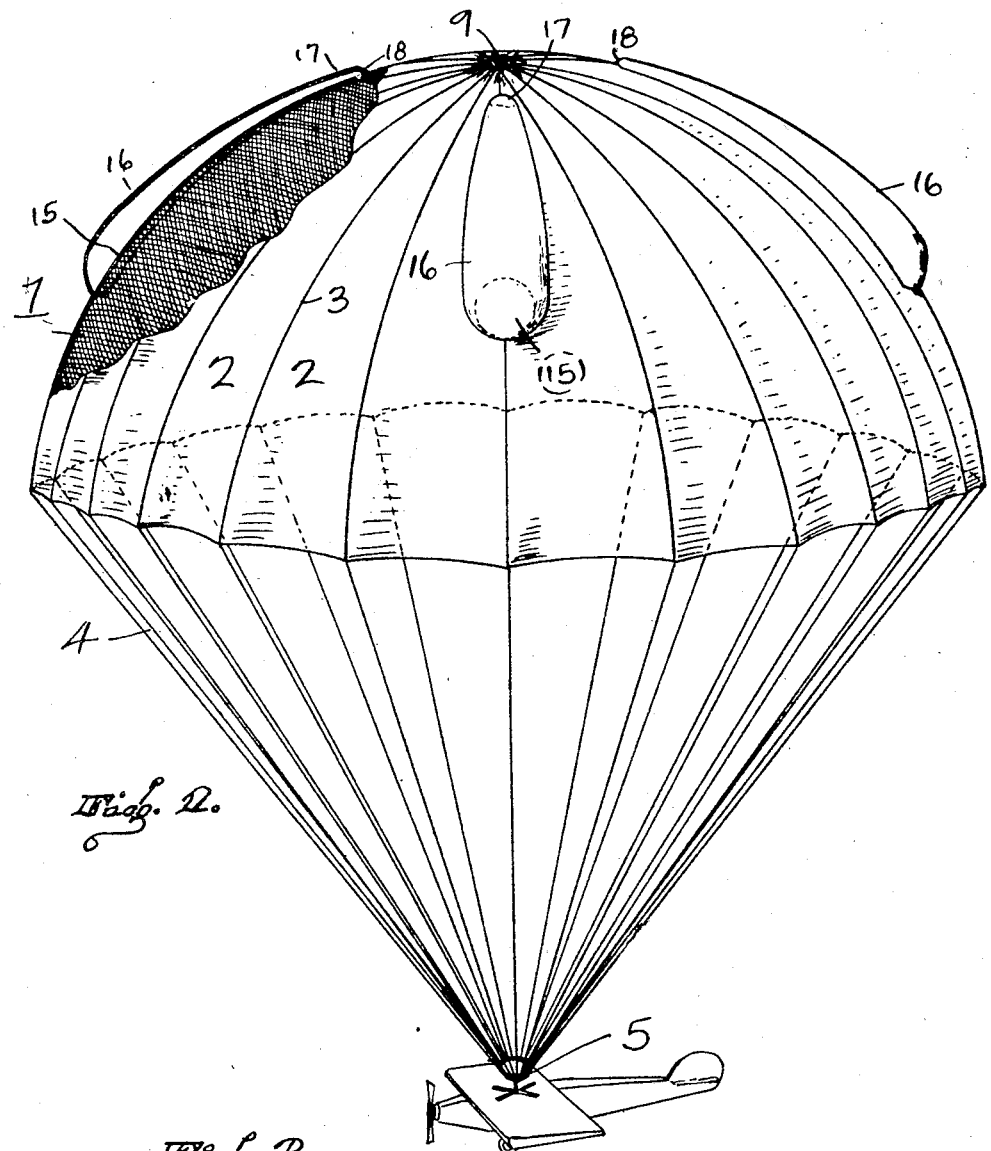
Fig. 1 represents a perspective view of a parachute constructed in accordance with my invention.

In detail the construction illustrated in the drawings comprises a concavo-convex sheet 1, preferably formed of silk, and made of a series of tapered segments or panels 2, united together along their meeting edges in seams 3. The edges of the segments are united in seams 3 and these seams are formed so as to loosely include the supporting lines 4 which extend from the carriage structure 5 upwardly to the lower edge of the parachute where they are attached to the material of the sheet, thence through the seams to the head of the parachute where they are formed in a loop 7 which lies in the hemmed edge 8 forming a vent 9 through the head or center of the parachute. The vent 9 consists of a circular hole through the center or head of the parachute held in a contracted position by a rubber cord 10 enclosed in the hem 8, which allows the vent to open and contract in accordance with the varying air pressures below the parachute. The size of the vent when contracted and when expanded, will vary with the size of the parachute.

When the parachute is in flight, the force of the air below the parachute, or whatever air pressure the parachute encounters as it drops, causes the vent in the head of the parachute to automatically open and contract, to relieve excessive air pressures to prevent damage or tearing of the parachute, and to allow the parachute to drop at a uniform rate of speed. The vent also causes the parachute to drop in a relatively straight path and eliminates any oscillating or swinging movement of the parachute.

I have provided a silk skirt 11 sewed continuously about the outside of the sheet 1 near the free edge thereof, said skirt being formed of segments or panels of the same material out of which the parachute is formed and sewed to the parachute so that the seams of the skirt are in substantial alignment with the seams of the parachute. The skirt is sewed to the parachute a substantial distance above the free edge of the sheet 1, whereby when the parachute is in flight, the skirt will fill with air and belly outward to provide additional surface to the air and consequently to increase the carrying capacity of the parachute. The skirt 11 is provided with a plurality of vents 12 formed therethrough at spaced intervals around the entire circumference thereof, each vent being formed by a circular seam sewed through the skirt with an expansible elastic band confined in the seam around the vent, to expand and contract automatically according to the pressure of the air below the parachute. The vents of the skirt permit the air force below the skirt to be dissipated therethrough and to prevent the said skirt from becoming torn or otherwise damaged in the event an air pressure is accumulated between the skirt and parachute and not dissipated therefrom. The edge of the skirt is provided with supporting lines 14 thereon which are connected to the supporting lines 4 of the parachute.

Figure 2:
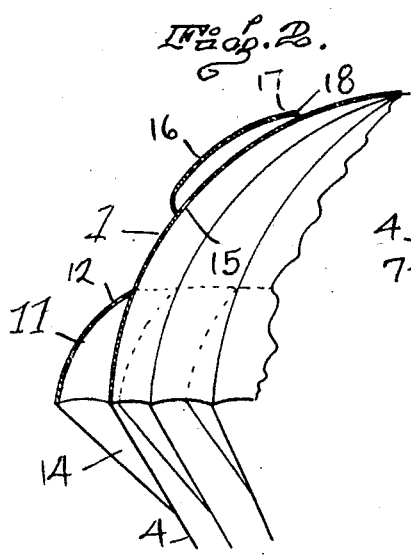
Fig. 2 represents a cross section through a parachute similar to that shown in Fig. 1, modified to the extent of having a skirt around the outside of the bottom of the said parachute.
Figure 3:
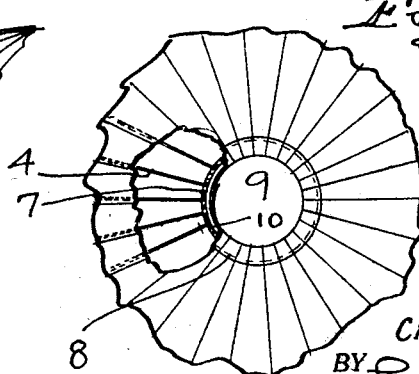
Fig. 3 is a plan view of a portion of the parachute around the vent.

The sheet 1 may either be equipped without a skirt as shown in Fig. 1, or equipped with a skirt as shown in Fig. 2, in either case the construction of the parachute proper is the same. The sheet 1 is provided with a plurality of openings 15 at regularly spaced intervals throughout the circumference thereof, each opening being substantially midway between the edge of the skirt and the center or head thereof. A conduit 16, formed of silk, or of the material out of which the parachute is formed, is arranged on the outside of the sheet 1, each conduit communicating at one end thereof with the opening 15 through the sheet and extending upwardly with a tapering and decreasing cross section, to a relatively contracted end 17 located adjacent the center or head of the sheet 1. The contracted end of the conduit 16 is provided with a discharge outlet 18 therein. When the parachute is in flight, the air pressure thus confined beneath the parachute escapes, either through the expansion head 9, or this air pressure may pass outwardly through the openings 15 in the parachute into the restricting conduits 16 through which it is passed and reduced in velocity before it is allowed to escape into the atmosphere. The conduits 16 are designed to retard the flow of air that passes out through the parachute to the atmosphere to hold said air a reasonable length of time before discharging it, to utilize the same for retarding the dropping speed of the parachute and at the same time to increase the carrying capacity thereof.

Having thus described this invention, what I claim and desire to secure by Letters Patent is:

1. A parachute comprising a concavo-convex sheet having a plurality of openings therethrough between the circumferential edge and center of the sheet; a plurality of conduits mounted on the outside of the sheet, each of which communicate at one end thereof with a related opening in the sheet and communicates at its opposite end directly with the atmosphere; and supporting lines secured in spaced relation around the edge of the concavo-convex sheet.

2. A parachute comprising a concavo-convex sheet having a plurality of openings therethrough between the circumferential edge and center of the sheet; a plurality of conduits mounted on the outside of the sheet, each of which communicate at one end thereof with a related opening in the sheet and communicates at its opposite end with the atmosphere, said conduits being independent of each other tapering in cross section at the point of communication with the openings through the sheet to a relatively small discharge orifice whereby to reduce the velocity of air pressure admitted into the said conduits from the interior of the parachute before discharging said pressure to the atmosphere; and carrying lines secured in spaced relation around the edge of the concavo-convex sheet.

3. A parachute comprising a concavo-convex sheet formed with a vent in the center thereof which is adapted to open and contract in accordance with the varying air pressures below the parachute, said sheet having a plurality of openings therethrough between the circumferential edge and center of the sheet; a plurality of conduits mounted on the outside of the sheet, each of which communicate at one end thereof with a related opening in the sheet and communicates at its opposite end with the atmosphere, said conduits being independent of each other; and supporting lines secured in spaced relation around the edge of the concavo-convex sheet.

4. A parachute comprising a concavo-convex sheet formed with a vent in the center thereof which is adapted to open and contract in accordance with the varying air pressures below the parachute, said sheet having a plurality of openings therethrough between circumferential edge and center of the sheet; a plurality of separate conduits mounted on the outside of the sheet, each of which communicate at one end thereof with a related opening in the sheet and communicates at its opposite end with the atmosphere, said conduits tapering in cross section at the point of communication with the openings through the sheet to a relatively small discharge orifice whereby to reduce the velocity of air pressure admitted into the said conduits from the interior of the parachute before discharging said pressure to the atmosphere; and carrying lines secured in spaced relation around the edge of the concavo-convex sheet.

5. A parachute comprising a concavo-convex sheet having a plurality of openings therethrough between the circumferential edge and center of the sheet; a plurality of separate conduits mounted on the outside of the sheet, each of which communicate at one end thereof with a related opening in the sheet and communicates at its opposite end with the atmosphere; supporting lines secured in spaced relation around the edge of the concavo-convex sheet; and a skirt around the outside of the bottom of the parachute secured to the sheet above the edge thereof and having supporting lines thereon attached to the supporting lines of the parachute.

6. A parachute comprising a concavo-convex sheet having a plurality of openings therethrough between the circumferential edge and center of the sheet; a plurality of separate conduits mounted on the outside of the sheet, each of which communicate at one end thereof with a related opening in the sheet and communicates at its opposite end with the atmosphere; supporting lines secured in spaced relation around the edge of the concavo-convex sheet; and a skirt attached around the outside of the bottom edge of the parachute secured to the sheet above the edge thereof and having a plurality of vents therein which are adapted to open and contract in accordance with the varying air pressures below the parachute and having carrying lines along the free edge thereof attached to the first mentioned carrying lines.

7. A parachute comprising a concavo-convex sheet having a plurality of openings therethrough between the circumferential edge and center of the sheet; a plurality of conduits mounted on the outside of the sheet, each of which communicate at one end thereof with a related opening in the sheet and communicates at its opposite end with the atmosphere at a point spaced from the apex of the sheet, and supporting lines secured in spaced relation around the edge of the concavo-convex sheet.

8. A parachute comprising a concavo-convex sheet formed with a vent in the center thereof which is adapted to open and contract in accordance with the varying air pressures below the parachute, said sheet having a plurality of openings therethsough between the circumferential edge and center of the sheet; a plurality of conduits mounted on the outside of the sheet, each of which communicate at one end thereof with a related opening in the sheet and communicates at its opposite end with the atmosphere at a point spaced from the apex of the sheet; and supporting lines secured in spaced relation around the edge of the concavo-convex sheet.

9. A parachute comprising a concavo-convex sheet formed with a vent in the center thereof which is adapted to open and contract in accordance with the varying air pressures below the parachute, said sheet having a plurality of openings therethrough between the circumferential edge and center of the sheet; a plurality of conduits mounted on the outside of the sheet, each of which communicate at one end thereof with a related opening in the sheet and communicates at its opposite end with the atmosphere, said conduits tapering in cross section at the point of communication with the openings through the sheet to a relatively small discharge orifice at a point spaced from the apex of the sheet, whereby to reduce the velocity of air pressure admitted into the said conduits from the interior of the parachute before discharging said pressure to the atmosphere; and carrying lines secured in spaced relation around the edge of the concavo-convex sheet.

In testimony whereof, I have hereunto set my hand at San Francisco, California, this 11th day of October 1928.

CHARLES BROADWICK.